Figure 1:
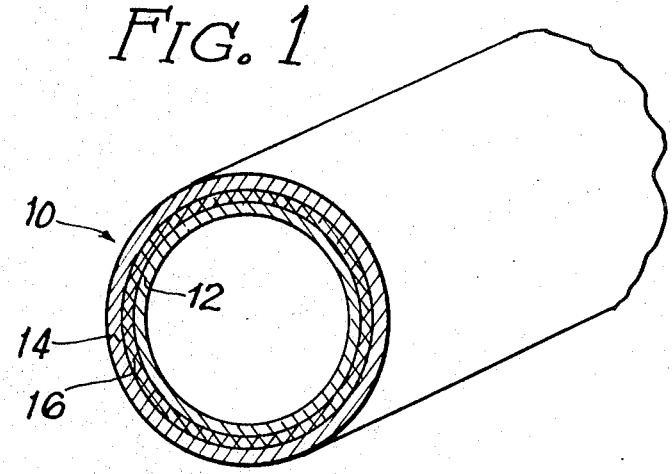

United States Patent [11] 3,561,493

[72] Inventors Paul Maillard
16 Boulevard Sebastopol, Paris, 2 ieme;
Michel Rebeyrolle, rue des Ponts, Vienne le
Chateau, Marne, France
[21] Appl. No. 449,874
[22] Filed Apr. 21, 1965
[45] Patented Feb. 9, 1971

[54] COMPOSITE TUBES AND METHOD OF MANUFACTURING SAME
6 Claims, 2 Drawing Figs.
[52] U.S. Cl. ................................................. 138/141,
138/137, 138/177; 18/13, 264/173, 264/248;
156/306; 161/188
[51] Int. Cl. ..................................................... F16l 9/14,
F16l 11/04
[50] Field of Search............................................ 138/137,
140, 141, 177; 18/13N, M, P, 14P; 264/173, 174,
209, 248; 156/293, 294, 306; 161/188

[56] References Cited
UNITED STATES PATENTS

| | | | |
|---|---|---|---|
| 2,645,249 | 7/1953 | Davis............................ | 138/137X |
| 3,223,761 | 12/1965 | Raley ............................ | 18/14PX |
| 3,009,207 | 11/1961 | Romesberg et al. .......... | 161/227X |
| 3,114,409 | 12/1963 | Iknayan et al. ................ | 156/309X |
| 3,184,358 | 5/1965 | Utz................................. | 161/227UX |
| 2,076,456 | 4/1937 | Gams et al..................... | 138/137UX |
| 2,867,241 | 1/1959 | Harris............................ | 138/137 |

*Primary Examiner*—Herbert F. Ross
*Attorneys*—James W. Fitzsimmons and Louis F. Heeb

ABSTRACT: This invention is addressed to a tube formed of a plurality of interbonded layers of plastic material in which the plastic material in one layer differs from the plastic material in others with the adjacent layers of different plastic materials being interbonded with a layer formed of a precompounded mixture of the plastic materials making up the adjacent layers and extruded between said layers.

COMPOSITE TUBES AND METHOD OF MANUFACTURING SAME

The present invention relates to composite tubes having at least two layers or films of different plastic materials which are welded together, and the method of manufacturing such tubes.

In order to be able to use the tubes for substantially universal packing of the most different products, it has already been proposed to manufacture composite tubes having two tubular films of different plastic materials, in order to take advantage to the utmost of the desirable properties of the different plastics. Thus it is known to manufacture by extrusion tubes which have an outer film of polyethylene and an inner film of polyamide. However, the tubes of this type have the defect that these films are not welded together so that they separate upon the subsequent operations.

In accordance with one known method of manufacture for joining the films together, the inner film is imparted the shape of a finned tube, the said fins permitting the catching of the outer second layer on the inner first layer. In order to overcome the above-mentioned defect, a namely insufficient welding together of the plastic films, it has been proposed to subject these films, at the time of their emergence from the extrusion die, to treatment by hot gases on the faces which are to be bonded together.

In another method, it has been proposed to arrange between two layers of plastic material an intermediate layer of a plastic material which bonds to the other two.

We have found a method which remedies this serious drawback and permits the manufacture of composite tubes, the different layers or films of which are firmly welded together, even in the case of plastic materials which ordinarily do not adhere, do not bond or bond poorly to one another.

The object of the present invention is a method of manufacturing composite tubes having at least two tubular layers or films of plastics of different type welded together under the action of heat which consists essentially in arranging between an inner tubular layer or film and an outer tubular layer or film of different plastics at least one intermediate layer which may be composed of one or more tubular layers or films of material having a homogeneous structure, the tubular layers or films of plastics of homogeneous structure alternating with tubular layers or films formed of mixtures of the two constituent plastics of the tubular layers or films immediately adjacent the mixture layer or film. The said mixture is not necessarily entirely homogeneous.

Figure 2:
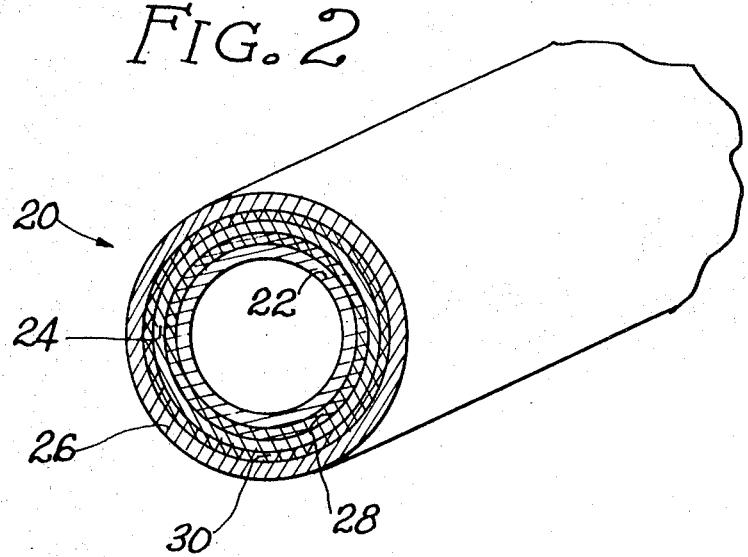

These and other objects of this invention will hereinafter appear and for purposes of illustration, but not of limitation, an embodiment of the invention is shown in the accompanying drawing, in which:

FIG. 1 is a perspective view partially in section of a tubular member formed in accordance with the practice of this invention; and FIG. 2 is a perspective view partially in section of a modified construction of the tubular member.

In accordance with one particular way of carrying out the invention for the manufacture of tubes 10 composed of two different plastic materials, three tubular layers or films are extruded simultaneously, one, the inner layer 12 being composed of one of the plastic materials, the other, namely the outer layer 14 being composed of the other plastic material, and the intermediate layer 16 being composed of a mixture of the two plastic materials; the mixture of the two plastic materials constituting the intermediate layer is preferably not perfectly homogeneous.

In accordance with the invention, when it is desired to obtain a tube 20 comprising three different plastic materials, five layers are extruded, each of three different layers, namely, inner 22, middle 24 and outer layer 26, each being composed of one of the plastic materials selected and two intermediate layers, the one 28 between the inner layer and the middle layer being composed of the mixture of the two plastic materials, constituent of each of these two layers, the other 30, between the middle layer and the outer layer being composed of the mixture of the two plastic materials which are constituent of said last two layers.

In accordance with one particularly interesting embodiment, the necessary number of layers of plastic materials and intermediate layers of mixtures of plastic material are extruded coaxially by means of a die having a sufficient number of feed systems for the different plastic materials or mixtures of plastic materials.

In one particularly advantageous method of manufacturing composite tubes of two different plastic materials, three feed devices, such as for instance extruders, are arranged on one and the same extruder head, each of said devices feeding the so constituent material of one layer. The relative position of the devices along the axis of the extrusion machine is a function of the position or order of the film in the composite tube to be manufactured. The feed device supplying the material of the inner layer is of course furthest from the outlet orifice of the die, the other devices being staggered suitably between these two points, namely the first device and the outlet orifice.

In accordance with a variant of the invention, two tubular films are extruded together, namely the inner film and the intermediate film, by an extruder head for two-layer tubes having two feed devices and the outer film which is for by means of another suitable die is applied for example by means of a device of the collar type.

The plastic materials which can be used for the manufacture of tubes in accordance with the invention include all extrudable plastic materials, for instance, with without the following to be considered limitative:

Cellulose esters and ethers, for example ethyl cellulose and cellulose acetate, acetobutyrate, and acetopropionate; vinyl and vinylidene polymers and copolymers for instance polymers and copolymers of vinyl chloride, vinyl acetate, vinylidene chloride, polyvinyl alcohol, polyvinyl butyral, polymers and copolymers of acrylic and methacrylic esters; polymers and copolymers olefins, such as ethylene and propylene, polymers and copolymers of styrene, of α-methyl styrene and their mixtures or elastomeric copolymers; polyamides, interpolyamides, such as polyhexamethylene adipamide, poly-ε-caprolactam, polyundecanamide, polyhexamethylene-sebacamide; polycarbonates, polyethers such as polyaldehydes, polyurethanes; natural and synthetic elastomers, thermoplastic fluorinated resins, silicone resins and elastomers. Preferably, polyolefins are used, in particular polyethylenes and polyamides, especially polyundecanamide.

These plastic materials can, of course, be used in mixture with fillers or plasticizers, colorants or other ordinary additions, provided that they are in the state permitting blow-extrusion, which state is well known to those skilled in the art.

Plastic materials whose known properties are complementary are used together. By way of example of the properties desired, mention may be made of the following, without this list to be considered limitative: mechanical strength, resistance to shock, thermal properties, transparency, opacity, resistance to chemicals, impermeability to liquids, gases and odors, ease of working, ability to receive printing or decoration, etc.

By way of illustration and not of limitation of the invention, there will be described below the manufacture of tubes comprising an outer film of polyethylene obtained by any known method of polymerization of ethylene and an inner film of polyamide, for instance polyundecanamide. The intermediate film consists of a mixture in which the proportions by weight are between 5 and 95 per cent polyethylene and 95 and 5 per cent polyamide, and preferably between 50 and 70 per cent polyethylene and 30 and 50 per cent polyamide. These limits are capable of variation, depending on the quality of the raw materials used.

EXAMPLE

An extruder having three feed devices is employed. One of the devices feeds granules of "high-pressure" polyethylene, another device feeds granules of polyamide sold under the registered trademark "Rilsan," and the third device feeds, for the intermediate layer, granules of polyethylene-polyundecanamide mixture, prepared by means of a twin-screw extruder, the said mixture comprising 60 percent by weight polyethylene and 40 percent by weight polyamide.

For the extrusion of the polyethylene layer, the temperature of the body of the extruder is between 170° and 210° C. for the extrusion of the mixture, the temperature of the body of the extruder is between 190° and 210° C. for the extrusion of the polyamide ("Rilsan"), the temperature of the body of the extruder is between 200° and 220° C. The temperature of the extruder head is close to 220° C.

The adjustment of the feeding of the air into the tube, as well as the cooling at the outlet of the extruder and the adjustment of the speed of drawing are effected as in the case of the extrusion of a single-layer tube, but with due consideration of the characteristics of the different resins employed for the multiple layers.

All modifications or variations of the means of carrying out the present process must of course be considered to fall within the scope of the present invention.

SUMMARY

The object of the present invention is:

1. By way of novel industrial products, tubes comprising at least two different plastic materials in the form of tubular layers or films welded to each other, the said tubes having furthermore the following features, considered individually or in combination:
   a. they comprise, between an inner tubular layer or film of one plastic material and an outer tubular layer or film of another plastic material, at least one intermediate layer which can be composed of one or more tubular layers or films of plastic material of homogeneous structure, the tubular layers or films of plastic materials of homogeneous structure alternating with layers formed of a mixture of two plastic materials, constituent of the layers or films immediately adjacent the mixture layer;
   b. the layers or films consisting of a mixture of two plastic materials are composed of a mixture of plastic materials which is not necessarily perfectly homogeneous;
   c. The plastic materials of different type used are polyolefins, in particular polyethylenes, and polyamides, in particular polyundecanamide;
   d. the tube comprises three layers, an outer layer of polyethylene, an inner layer of polyundecanamide, the intermediate layer being composed of a mixture of polyethylene and polyundecanamide, which mixture is not necessarily perfectly homogeneous; and
   e. the intermediate layer according to (d) is formed of 50 to 70 per cent by weight polyethylene and 30 to 50 per cent by weight polyundecanamide.

2. A method for the manufacture by extrusion of the composite tubes described under 1, which method has the following features, taken individually or in combination;
   a. between an inner tubular layer or film and an outer tubular layer or film of different types of plastic material, there is extruded at least one intermediate tubular layer or film which may be composed of one or more tubular layers or films of plastic materials having a homogeneous structure, the layers of plastic materials of homogeneous structure alternating with layers formed of a mixture of the two plastic materials constituent of the tubular layers or films immediately adjacent the mixture layer or film;
   b. the said mixtures of plastic materials according to (a) are not necessarily perfectly homogeneous;
   c. a tube according to (1 d) having an inner layer of polyamide and an outer layer of polyethylene is manufactured by simultaneously extruding three layers, an inner layer, an intermediate layer and an outer layer, the intermediate layer being composed of a mixture of polyethylene and polyamide, which mixture is not necessarily perfectly homogeneous;
   d. the intermediate layer according to (2 c) is extruded with the use of a mixture having proportions by weight of between 5 and 95 per cent polyethylene and 95 and 5 per cent polyamide;
   e. the intermediate layer according to (2 c) is extruded with the use of a mixture having proportions by weight of between 50 and 70 per cent high-pressure polyethylene and 30 and 50 per cent polyundecanamide; and
   f. tubes according to (2c) and (2e) are manufactured by using a triple-die head fed by three extruders, the temperature of the body of the extruder feeding the polyundecanamide being between 200° and 220° C. the temperature of the body of the extruder feeding the high-pressure polyethylene being between 170° and 210° C. and the temperature of the body of the extruder for the mixture being between 190° and 210° C. and the temperature of the extrusion head being about 220° C.

We claim:

1. A plastic tube comprising inner, middle and outer continuous fused layers each formed of a different plastic material, a continuous component layer between the inner and middle layer composed of a mixture of the plastic materials making up the inner and intermediate layer and interbonding the adjacent layers by fusion with the inner and intermediate layers one to the other, and a second tubular continuous fused layer between the middle and outer layers composed of a mixture of the plastic materials making up the middle and outer layers and interbonding the adjacent layers by fusion with the middle and outer layers one to the other, wherein said outer layer is a polyolefin and said n inner layer is a polyamide.

2 A plastic tubes as claimed in claim 1 wherein said outer layer is polyethylene.

3. A plastic tube as claimed in claim 1 wherein said inner layer is polyundecanamide.

4. A plastic tube as claimed in claim 1 wherein said intermediate layer is a less than perfectly homogeneous mixture having the proportions by weight of between 50 and 70 per cent polyolefin and 50 and 30 per cent polyamide.

5. A plastic tub tube comprising an outer continuous tubular fused layer of a polyolefin, a continuous inner tubular fused layer of a polyamide, and an intermediate continuous fused layer of a plastic material composed of a mixture of the plastic materials making up the inner and outer layers in uniform distribution with the intermediate layer interbonding by fusion substantially throughout the interfaces with the outer continuous layer and inner continuous layer of different plastic materials.

6. A plastic tube as claimed in claim 5 in which the mixture of materials present in the intermediate and interbonding layer are present in the proportion of 5—95 parts by weight of the plastic material in one layer and 95—5 parts by weight of the plastic material in the other layer.

UNITED STATES PATENT OFFICE
CERTIFICATE OF CORRECTION

Patent No. 3,561,493　　　　　　　　　Dated February 9, 1971

Inventor(s)　Paul Maillard et al.

It is certified that error appears in the above-identified patent and that said Letters Patent are hereby corrected as shown below:

On the cover sheet insert -- [73] assignee: Tuboplast-France S.A., Paris, France --. Column 2, line 14, cancel "so"; line 25, "for" should read -- extruded --.

Signed and sealed this 14th day of September 1971.

(SEAL)
Attest:

EDWARD M. FELTCHER, JR.　　　　ROBERT GOTTSCHALK
Attesting Officer　　　　　　　　Acting Commissioner of Pa-

FORM PO-1050 (10-69)